(12) United States Patent
Lee (10) Patent No.: US 7,979,268 B2
(45) Date of Patent: Jul. 12, 2011

(54) STRING MATCHING METHOD AND SYSTEM AND COMPUTER-READABLE RECORDING MEDIUM STORING THE STRING MATCHING METHOD

(75) Inventor: Kyung-eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1426 days.

(21) Appl. No.: 11/453,597

(22) Filed: Jun. 16, 2006

(65) Prior Publication Data
US 2007/0055493 A1 Mar. 8, 2007

(30) Foreign Application Priority Data

Aug. 30, 2005 (KR) .................. 10-2005-0080172

(51) Int. Cl.
 G06F 17/28 (2006.01)
 G06F 17/20 (2006.01)
(52) U.S. Cl. .............. 704/9; 704/2; 704/4; 704/7; 704/8
(58) Field of Classification Search ............. 704/1–10
 See application file for complete search history.

(56) References Cited

U.S. PATENT DOCUMENTS

| 5,867,811 | A | * | 2/1999 | O'Donoghue | 704/1 |
|---|---|---|---|---|---|
| 6,292,768 | B1 | * | 9/2001 | Chan | 704/1 |
| 6,460,015 | B1 | * | 10/2002 | Hetherington et al. | 704/8 |
| 6,794,566 | B2 | | 9/2004 | Pachet | |
| 6,864,809 | B2 | * | 3/2005 | O'Dell et al. | 341/28 |
| 6,950,792 | B1 | * | 9/2005 | Nussbaum | 704/8 |
| 7,292,971 | B2 | * | 11/2007 | Su | 704/5 |
| 7,587,306 | B2 | * | 9/2009 | Teytaud | 704/2 |
| 2002/0083029 | A1 | * | 6/2002 | Chun et al. | 706/45 |
| 2002/0128813 | A1 | * | 9/2002 | Engelsberg et al. | 704/1 |

(Continued)

FOREIGN PATENT DOCUMENTS

JP 2001-067364 A 3/2001

(Continued)

OTHER PUBLICATIONS

Kang, Byung-du and Key-Sun Choi, 2000, "Automatic Transliteration and Back-Transliteration by Decision-Tree Learning." in Proceedings of the 2nd International Conference on Language Resources and Evaluation (LREC 2000),1135-1141.*
Michael A. Covington. 1996. An algorithm to align words for historical comparison. Computational Linguistics, 22(4):481-496.*
Knight, K., and Graehl, J. 1998. Machine transliteration. Computational Linguistics 24(4):599-612.*

(Continued)

*Primary Examiner* — James S Wozniak
*Assistant Examiner* — Edgar Guerra-Erazo
(74) *Attorney, Agent, or Firm* — Sughrue Mion, PLLC (57) ABSTRACT

A string matching method, system, and a computer-readable medium storing instructions for determining and obtaining a representative string for a plurality of strings that are written in various manners but share the same meaning. The string matching method includes: converting the input string into one or more second-language strings with reference to a language mapping table, which stores a plurality of pieces of mapping information for mapping a first-language string to a second-language string, and generating a conversion list; searching a representative list database, which storing a plurality of records each with a representative string and a corresponding second-language representative string, for records including the same second-language representative strings as the respective second-language strings in the conversion list and generating a candidate list; and determining a representative string from the candidate list to be an output representative string. Therefore, the string matching can provide string-based multimedia data classification scenarios.

20 Claims, 9 Drawing Sheets

U.S. PATENT DOCUMENTS

| | | | |
|---|---|---|---|
| 2002/0198701 A1* | 12/2002 | Moore | 704/2 |
| 2003/0040909 A1* | 2/2003 | Ghali | 704/235 |
| 2003/0074185 A1* | 4/2003 | Kang | 704/2 |
| 2004/0252604 A1 | 12/2004 | Johnson et al. | |
| 2005/0216253 A1* | 9/2005 | Brockett | 704/5 |
| 2006/0248459 A1* | 11/2006 | Su | 715/703 |
| 2007/0011132 A1* | 1/2007 | Zhou et al. | 707/1 |

FOREIGN PATENT DOCUMENTS

| | | |
|---|---|---|
| KR | 2000-0060727 A | 10/2000 |
| KR | 10-2001-0016679 A | 3/2001 |
| KR | 10-2001-0108615 A | 12/2001 |
| KR | 10-0326936 B1 | 2/2002 |

OTHER PUBLICATIONS

Jong-Hoon Oh and Key-Sun Choi. 2002. An English-Korean transliteration model using pronunciation and contextual rules. In Proceedings of the 19th International Conference on Computational Linguistics (COLING), Taipei, Taiwan.*

Lee, J. S. and K. S. Choi, 1998. English to Korean Statistical transliteration for information retrieval. Computer Processing of Oriental Languages, 12(1):17--37.*

Jung, S. Y., Hong, S., and Paek, E. 2000. An English to Korean transliteration model of extended Markov window. In Proceedings of the 18th Conference on Computational Linguistics—vol. 1 (SaarbriJcken, Germany, Jul. 31-Aug. 4, 2000), pp. 383-389.*

* cited by examiner

| KOREAN | 1st ENGLISH TRANSLITERATION | 2nd ENGLISH TRANSLITERATION | 3rd ENGLISH TRANSLITERATION | |
|---|---|---|---|---|
| S1 | ga | ka | gha | |
| S2 | gya | kya | | |
| S3 | gou | geo | | ⎯711 |
| ⋮ | ⋮ | ⋮ | ⋮ | |
| Sn | hee | hui | heui | ⎯712 |

FIG. 7B

| KOREAN | 1st ENGLISH TRANSLITERATION | 2nd ENGLISH TRANSLITERATION | 3rd ENGLISH TRANSLITERATION | |
|---|---|---|---|---|
| T1 | k | g | | |
| T2 | n | | | |
| T3 | d | t | th | ⎯721 |
| ⋮ | ⋮ | ⋮ | ⋮ | |
| Tk | h | | | |

STRING MATCHING METHOD AND SYSTEM AND COMPUTER-READABLE RECORDING MEDIUM STORING THE STRING MATCHING METHOD

CROSS-REFERENCE TO RELATED PATENT APPLICATION

This application claims priority from Korean Patent Application No. 10-2005-0080172, filed on Aug. 30, 2005, in the Korean Intellectual Property Office, the disclosure of which is incorporated herein in its entirety by reference.

BACKGROUND OF THE INVENTION

1. Field of the Invention

Methods and systems consistent with the present invention relate to string matching and, more particularly, to string matching used for processing a plurality of strings that are written in different manners but share the same meaning.

2. Description of the Related Art

In application services using metadata of multimedia files (e.g., MPEG Audio Layer-3 (MP3) files), multimedia data often needs to be classified according to information included in the metadata, for example, according to the names of artists who have produced the multimedia data or the genre of the multimedia data, and then, the classification results need to be displayed to users.

Such metadata may include expressions written in various languages, and/or include special characters, such as spaces (' ') and hyphens ('-'). In the case of metadata produced by an ordinary user, strings which share the same meaning but are written in different languages and/or in different forms may be mistaken as having different meanings.

For example, in an application program for MP3 players, music files can be classified according to the names of singers. In this case, a plurality of strings all of which refer to the same singer, for example, the Korean singer, Lee Mija, may be mistaken as referring to different singers depending on various factors. For example, these factors are whether or not they are written in Korean or English, depending on how they are spelled (e.g., 'Lee Miza' vs. 'Lee Mija'), whether words in the strings are each separated by a space (e.g., 'Lee Mija' vs. 'Lee Mi Ja'), and whether words in the strings are hyphenated (e.g., 'Lee Mija' vs. 'Lee Mi-Ja'). As a result, these factors cause inconvenience and impose restrictions on the development of various application services.

SUMMARY OF THE INVENTION

Exemplary embodiments of the present invention may overcome the above disadvantages and other disadvantages not described above. The present invention is not necessarily required to overcome any of the disadvantages described above, and the present invention may not overcome any of the problems described above. The appended claims should be consulted to ascertain the true scope of the invention.

The present invention provides a string matching method and system in which a representative of a plurality of strings, which share the same meaning but are written in various manners, is searched for. The present invention may further provide a computer-readable medium storing the string matching method.

According to an aspect of the present invention, there is provided a string matching method to output a representative string that matches an input string. The string matching method includes: converting the input string into one or more second-language strings with reference to a language mapping table storing a plurality of pieces of mapping information for mapping a first-language string to a second-language string, and generating a conversion list including the second-language strings into which the input string is converted; searching a representative list database storing a plurality of records, each record comprising a representative string and a corresponding representative second-language string, for records including the same representative second-language strings as the respective second-language strings included in the conversion list and generating a candidate list including the search results; and determining a representative string in one of the records in the candidate list to be an output representative string.

The string matching method may also include: searching a previous results database storing previous string matching results for a string that matches the input string and determining a representative string corresponding to the string that matches the input string to be the output representative string if the same string as the input string exists in the previous results database. The previous string matching results may comprise a plurality of strings and respective corresponding representative strings. I If the input string and the output representative string do not exist in the previous results database, the input string and the output representative string is stored in the previous results database.

The conversion of the input string into one or more English strings may include removing special characters that are meaningless from the input string.

The special characters may include hyphens and spaces.

If the first language is Korean and the second language is English, the language mapping table may include a plurality of pieces of mapping information for mapping a consonant-vowel cluster of a Korean syllable to one or more English strings and a plurality of pieces of mapping information for mapping a Korean consonant to one or more English strings. The conversion of the input string into one or more English strings and the generation of the conversion list may include decapitalizing of the input string, if the input string is an English string, and generating a conversion list including the decapitalized input string.

The string matching method may also include respectively giving priority scores to the plurality of pieces of mapping information included in the language mapping table. In this case, the conversion of the input string into one or more English strings and the generation of the conversion list comprise calculating matching scores of the second-language strings into which the input string is converted and generating a conversion list including only a predefined number of second-language strings into which the input string is converted and which have high matching scores.

The string matching method may also include respectively giving priority scores to the plurality of pieces of mapping information included in the language mapping table. In this case, the conversion of the input string into one or more English strings and the generation of the conversion list comprise calculating matching scores of the second-language strings into which the input string is converted and generating a conversion list including only a predefined number of second-language strings into which the input string is converted and which have high matching scores.

The string matching method may also include respectively giving priority scores to the plurality of pieces of mapping information included in the language mapping table. In this case, the conversion of the input string into one or more English strings and the generation of the conversion list comprise calculating matching scores of the second-language strings into which the input string is converted and generating a conversion list including only some of the second-language strings whose matching scores exceed a predefined reference value.

The determining of the output representative string may include allowing a user to choose one of the records included in the candidate list so that a representative string in the chosen record is determined to be the output representative string.

If the user chooses none of the records included in the candidate list, the determining of the output representative string may include determining the input string to be the output representative string, and the storing of the input string and the output representative string may include storing the input string and an English string in the candidate list having a highest matching score in the representative list database.

The string matching method may also include altering the priority scores respectively given to the plurality of pieces of mapping information by applying weights to some of the plurality of pieces of mapping information used for mapping the representative string in the chosen record to a corresponding representative second-language string.

The string matching method may also include respectively giving priority scores to the plurality of pieces of mapping information included in the language mapping table. In this case, the conversion of the input string into one or more English strings and the generation of the conversion list comprise calculating matching scores of the second-language strings into which the input string is converted, and the determining of the representative string comprises determining a representative string corresponding to an English string in the candidate list with a highest matching score to be the output representative string.

The determining of the output representative string may include determining a representative string corresponding to a second-language string in the candidate list having a highest matching score to be the output representative string.

If none of the matching scores of the second-language strings included in the candidate list exceed a predefined reference value, the determining of the output representative string may include determining the input string to be the output representative string, and the storing of the input string and the output representative string may include storing the input string and the English string in the candidate list with the highest matching score in the representative list database.

The string matching method may also include receiving multimedia data including the input string and extracting the input string from the multimedia data.

The multimedia data may be an MP3 file, and the extraction of the input string may include extracting an artist's name included in an ID3 tag of the MP3 file by parsing the MP3 file.

The determining of the output representative string may include replacing the input string in the multimedia data with the output representative string.

According to another aspect of the present invention, there is provided a computer-readable medium storing a computer program for executing the string matching method to output a representative string that matches an input string.

According to another aspect of the present invention, there is provided a string matching system that outputs a representative string that matches an input string. The string matching system includes: a representative list database which stores a plurality of representative strings and respective corresponding representative second-language strings; a language mapping table which stores a plurality of pieces of mapping information for mapping a first-language string to a second-language string; a second-language string generation unit which converts the input string into one or more second-language strings with reference to the language mapping table and generates a conversion list including the second-language strings into which the input string is converted; a representative list searching unit which searches the representative list database for records including the same representative second-language strings as the respective second-language strings included in the conversion list and generates a candidate list including the search results; and a representative string determination unit which determines a representative string included in one of the records included in the candidate list to be an output representative string.

The string matching system may also include: a previous results database which stores previous string matching results, comprising a plurality of strings and respective corresponding representative strings; a previous results searching unit which searches the previous results database for a string that matches the input string and determines a representative string corresponding to the string that matches the input string to be the output representative string; and a results storage unit which stores the input string and the output representative string in the previous results database if the input string and the output representative string does not exist in the previous results database.

The second-language string generation unit may remove special characters that are meaningless from the input string and convert the resulting input string into one or more English strings.

If the first language is Korean and the second language is English, the language mapping table may include a plurality of pieces of mapping information for mapping a consonant-vowel cluster of a Korean syllable to one or more English strings and a plurality of pieces of mapping information for mapping a Korean consonant to one or more English strings, and, if the input string is an English string, the second-language string generation unit may decapitalize the input string and generate a conversion list including the decapitalized input string.

Priority scores may be respectively given to the plurality of pieces of mapping information included in the language mapping table, and the second-language string generation unit may calculate matching scores of the second-language strings into which the input string is converted and generate a conversion list including only a predefined number of second-language strings into which the input string is converted and which have high matching scores.

The representative string determination unit may allow a user to choose one of the records included in the candidate list and determine a representative string in the chosen record to be the output representative string, and, if the user chooses none of the records in the candidate list, the representative string determination unit may determine the input string to be the output representative string, wherein if the representative string determination unit determines the input string to be the output representative string, the results storage unit stores the input string and an English string in the candidate list with a highest matching score in the representative list database.

The string matching system may also include a priority alteration unit which, if the representative string included in the chosen record is determined to be the output representative string, alters the priority scores respectively given to the plurality of pieces of mapping information by applying weights to some of the plurality of pieces of mapping information used for mapping the representative string in the chosen record to a corresponding second-language representative string.

Priority scores may be respectively given to the plurality of pieces of mapping information included in the language mapping table. In this case, the second-language string generation unit may calculate matching scores of the second-language strings into which the input string is converted, and the representative string determination unit may determine a representative string corresponding to an English string in the candidate list with a highest matching score to be the output representative string.

The representative string determination unit may determine a representative string corresponding to an English string in the candidate list with a highest matching score to be the output representative string.

The string matching system may also include an input string extraction unit which receives multimedia data including the input string and extracts the input string from the multimedia data.

The representative string determination unit may replace the input string included in the multimedia data with the output representative string.

According to yet another aspect of the present invention, a string matching system is provided. The string matching system includes means for generating at least one second language string corresponding to an input string based on language mapping information, where said input string is entered in a first language. The generation means may include the second language string generation unit, may be a software module or any combination of software and hardware, or any equivalents thereof. The system further includes means for storing the at least some of the second language strings. The storing means may be a buffer, a memory chip, and/or a software module executing the storage, or any equivalent thereof. The system further includes means for searching records of a representative storage for said at least some of the second language string. The records of the representative storage includes a number of second-language strings and corresponding, respective, output, second-language strings. The searching means may be a software module or any combination of software and hardware, the representative storage unit or any equivalent thereof. The system further includes means for determining an output representative string for the input string based on results of a search executed by the searching means. The determination means may be a software module or any combination of software and hardware, the representative string determination unit or any equivalent thereof. In this system, the same output representative string stored in the representative storage corresponds to various different input strings.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will now be described more fully with reference to the accompanying drawings in which same numeric references denote analogous elements.

Figure 1:
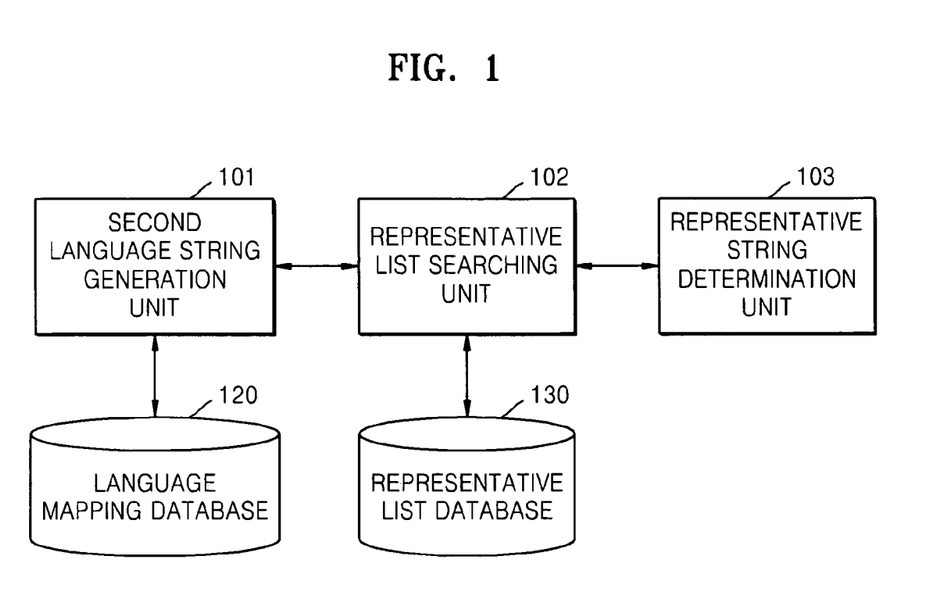
FIG. 1 is a block diagram of a string matching system according to an exemplary embodiment of the present invention.

FIG. 1 is a block diagram of a string matching system according to an exemplary embodiment of the present invention. Referring to FIG. 1, the exemplary system includes: a representative list database 130, which stores information regarding representative strings; a language mapping database 120, which stores language mapping tables that include information regarding how a string written in a language can be mapped to a string written in another language; a second language string generation unit 101 which generates a conversion list including one or more second-language transliterations of an input string; a representative list searching unit 102 which generates a list of representative string candidates based on the conversion list; and a representative string determination unit 103 which chooses one of the representative string candidates as a representative string.

Figure 9:
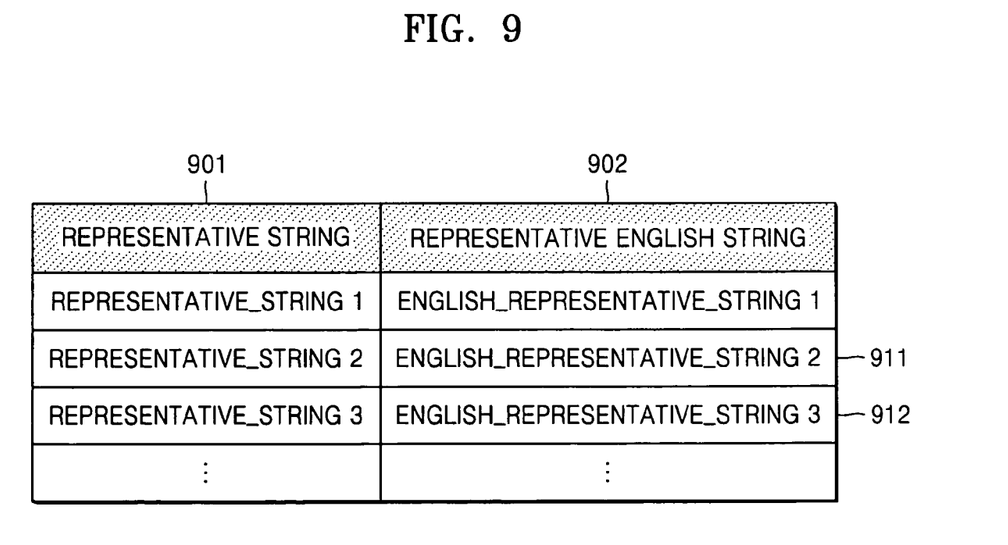
FIG. 9 is a diagram illustrating a representative list database according to an exemplary embodiment of the present invention.

The representative list database 130 stores a plurality of representative strings and respective corresponding representative second-language strings, which are written in a second language. FIG. 9 is a diagram of an exemplary representative list database 130. Referring to FIG. 9, the representative list database may include a plurality of representative strings 901, which represent the names of a plurality of singers, and respective corresponding English strings 902.

The language mapping table stored in the language mapping database 120 stores a plurality of pieces of mapping information for matching a first-language string to a second-language string or vice versa. For example, the language mapping table may include a plurality of Korean phonemes (elements of Korean letters) and respective corresponding English strings. In the language mapping table, one Korean phoneme may be mapped to more than one English string.

The second-language string generation unit 101 generates a conversion list, including a plurality of second-language transliterations of an input string, using the plurality of pieces of mapping information included in the language mapping table. The representative list searching unit 102 searches the representative list database 130 for records including the same second-language strings as the second-language strings included in the conversion list in the representative list database 130 and generates a candidate list based on the search results. The representative string determination unit 103 chooses a representative string included in one of the records in the candidate list as an output representative string.

Figure 2:
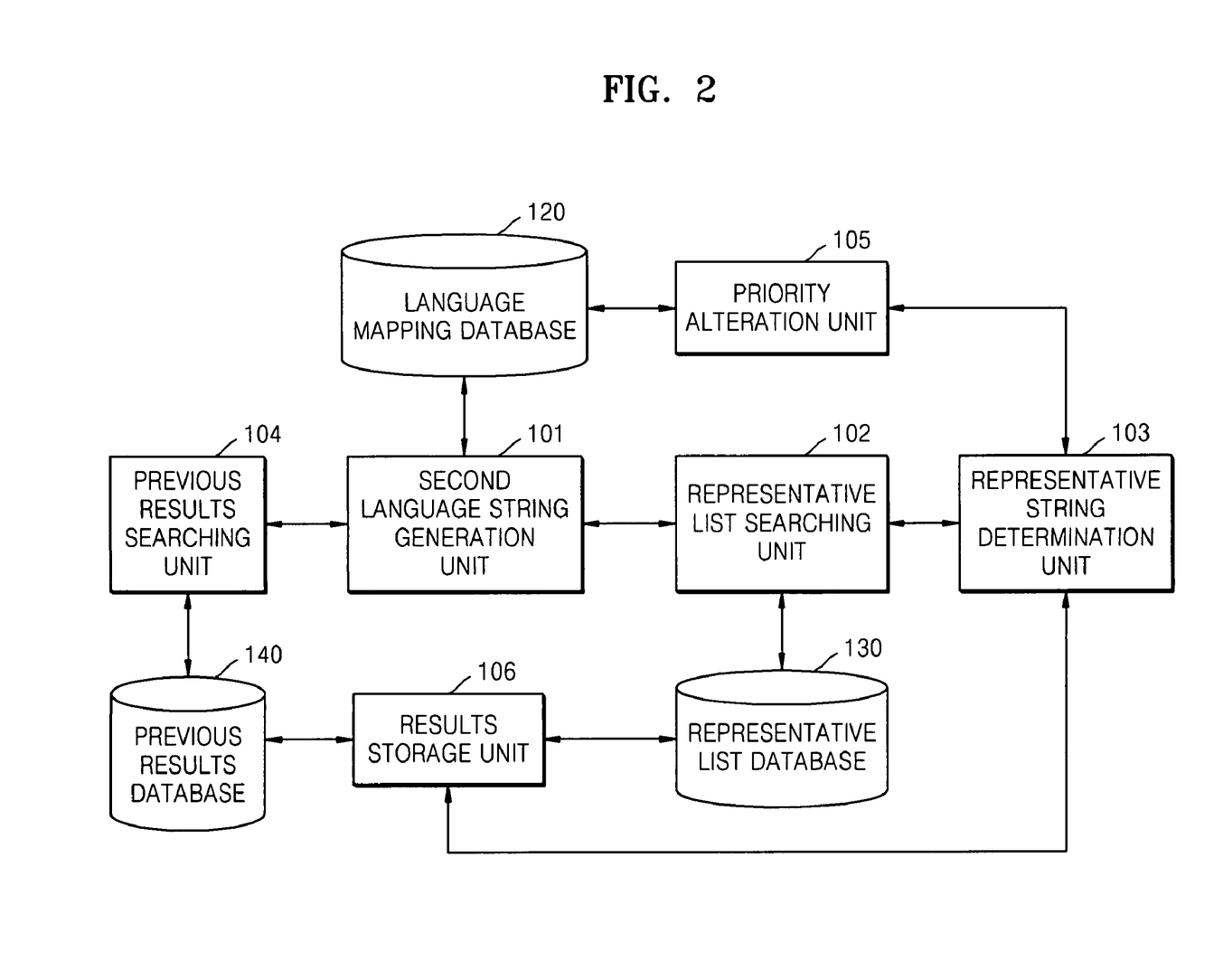
FIG. 2 is a block diagram of a string matching system according to another exemplary embodiment of the present invention.

FIG. 2 is a block diagram of a string matching system according to another exemplary embodiment of the present invention. Referring to FIG. 2, the string matching system includes: a representative list database 130; a language mapping database 120, which stores language mapping tables; a second-language string generation unit 101; a representative list searching unit 102; a representative string determination unit 103; a previous results database 140, which stores previous string matching results, including a plurality of strings and respective corresponding representative strings; a previous results searching unit 104, which determines whether a representative string for a predetermined input string has already been searched for; a results storage unit 106, which stores string matching results in the previous results database 140 and the representative list database 130; and a priority alteration unit 105, which alters priority scores given to mapping information in the language mapping tables.

Figure 8:
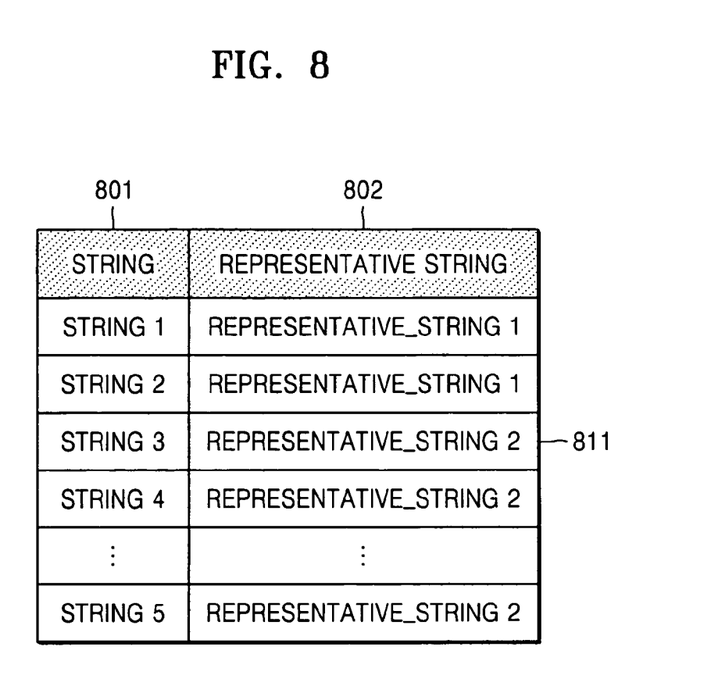
FIG. 8 is a diagram illustrating a previous results database according to an exemplary embodiment of the present invention.

FIG. 8 is a diagram of an exemplary previous results database 140. Referring to FIG. 8, the previous results database 140 may store a plurality of strings 801 written in various manners and respective corresponding representative strings 802. The strings stored in the previous results database 140 are string matching results stored by the results storage unit 106. If an input string is stored in the previous results database 140, there is no need to perform a string matching operation for the input string. The previous results searching unit 104 searches the previous results database 140 for the input string and returns a representative string corresponding to the search result (the string that corresponds to the input string stored in previous results database) as an output representative string, thereby enhancing the efficiency of string matching. For example, if the input string is a Korean string string3, the previous results searching unit 104 searches the previous results database 140 for a match for the Korean input string. Since a record comprising string3 and representative_string2 811 for the Korean input string string3 exists in the previous results database 140, it is determined that the Korean string string3 has already undergone a string matching operation. Thus, the Korean string representative_string2 is output as a representative string for the Korean input string string3.

If there is no match for the input string in the previous results database 140 and thus the input string is subjected to a string matching operation, a string chosen as a representative string for the input string through the string matching operation may be stored in the previous result database 140 by the results storage unit 106 so that it can be referenced when input at a later time.

The second-language string generation unit 101 removes special characters, if any, from the input string and generates one or more second-language transliterations of the resulting input string, thereby enhancing the efficiency of string matching for strings that include special characters. If the input string represents an artist's name, it may include special characters that are important and cannot be removed. Thus, special characters such as only hyphens ('-') and spaces (' ') may be removed from the input string to facilitate string matching. For example, if the input string is a Korean string that represents the name of a predetermined Korean musician and consists of three syllables 'Lee', 'Mi', and 'Ja', each separated by a space, the second-language string generation unit 101 may convert it into a Korean string consisting of three syllables 'Lee', 'Mi', and 'Ja' with no spaces in between. If the input string is an English transliteration of the name of the predetermined Korean singer, for example, 'Lee Mi-Ja', the second string generation unit 101 may convert it into an English string 'LeeMija'. However, special characters other than hyphens and spaces may also be removed from the input string, if necessary.

A Korean syllable consists of three phonemes which are a consonant, a vowel and a consonant, or two phonemes which are a consonant and a vowel. Assuming that a first language is Korean and the second language is English, the language mapping tables stored in the language mapping database 120 may include a plurality of pieces of mapping information used for mapping a cluster (hereinafter referred to as a consonant-vowel cluster) of a consonant and a vowel of a Korean syllable to an English string and a plurality of pieces of mapping information used for mapping a Korean consonant to one or more English strings. If the input string is an English string, each character in the English string is decapitalized without the need to reference the plurality of pieces of mapping information, and the decapitalized English string is added to a conversion list. If a Korean string is mapped to one or more English strings in units of phonemes so that a plurality of phonemes of each syllable of the Korean string are separately mapped to respective corresponding English strings, English strings representing phonemes that are not actually Korean may be generated, thereby increasing the number of cases returned by a query. Thus, the structure of the string matching system may be complicated, and the efficiency of string matching may decrease.

Figure 7A:
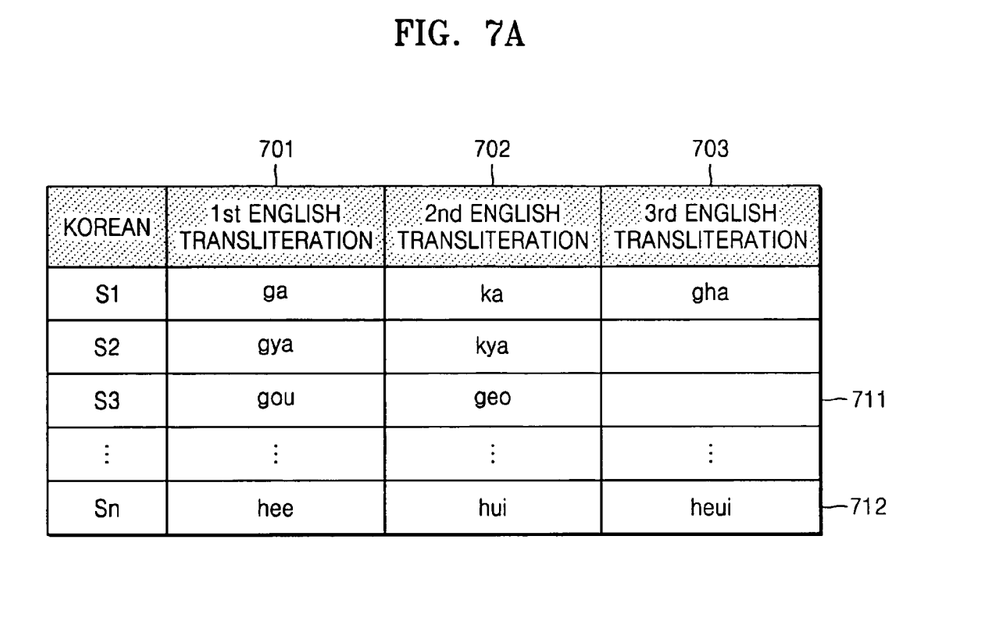
FIGS. 7A and 7B are diagrams illustrating a Korean consonant-vowel cluster mapping table and a Korean consonant mapping table, respectively, when a first language is Korean and a second language is English according to an exemplary embodiment of the present invention.
Figure 7B:
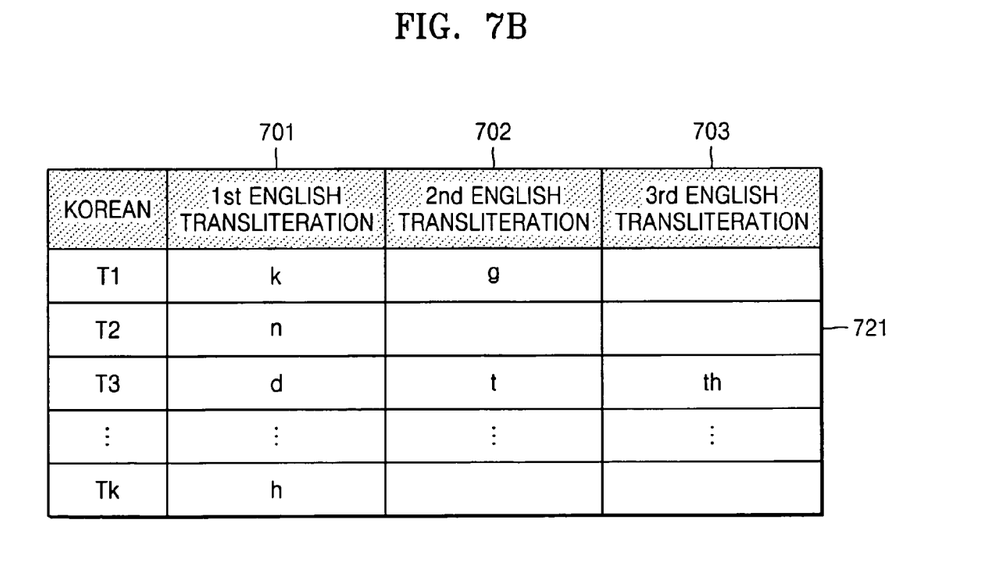

On the other hand, if a Korean string is mapped to one or more English strings in units of syllables, the size of the language mapping table may considerably increase. Therefore, in an exemplary embodiment, a Korean string may be mapped to one or more English strings in such a manner that a consonant-vowel cluster of a syllable of the Korean string is mapped to more than one English string separately from a last consonant of the syllable of the Korean string. FIGS. 7A and 7B are diagrams of an exemplary Korean consonant-vowel cluster mapping table and a Korean consonant mapping table, respectively.

Priority scores may be respectively given to the plurality of pieces of mapping information included in the language mapping tables. In this case, the second-language string generation unit 101 may calculate matching scores of a plurality of second-language transliterations of the input string with reference to the priority scores and generate a conversion list including only a limited number of second-language transliterations of the input string having relatively high matching scores.

The second-language strings included in the conversion list are input to the representative list searching unit 102. Then, the representative list searching unit 102 searches the representative list database 130 for records including the same representative second-language strings as the second-language strings included in the conversion list and generates a candidate list based on the search results.

The representative string determination unit 103 may display the candidate list to a user, allow the user to choose one of the records included in the candidate list, and determine a representative string included in the chosen record to be an output representative string. If the user chooses none of the records included in the candidate list, the input string may be determined to be an output representative string. In this case, the results storage unit 106 stores the input string in the representative list database 130 so that the input string can be referenced in subsequent string matching operations. The results storage unit 106 may store the input string in the representative list database 130 together with the second-language representative string with the highest matching score among the second-language representative strings listed in the candidate list.

The representative string determination unit 103 may choose a representative string included in one of the records included in the candidate list as an output representative string automatically without involving the user. If none of the matching scores of the second-language representative strings included in the candidate list exceed a predefined value that can be preset by the user or set by the system, the representative string determination unit 103 may determine the input string to be an output representative string. In this case, the results storage unit 106 may store the input string in the representative list database 130 together with the second-language representative string with the highest matching score among the second-language representative strings listed in the candidate list.

The priority alteration unit 105 alters the priority scores respectively given to the plurality of pieces of mapping information included in the language mapping tables. For example, if the user chooses as an output representative string a representative string included in one of the records listed in the candidate list, the priority alteration unit 105 may apply weights only to some of the plurality of pieces of mapping information used for mapping the representative string to the second-language string included in the chosen record. In this manner, the priority alteration unit 105 can efficiently optimize the priority scores of the plurality of pieces of mapping information by adaptively altering the priority scores of the plurality of pieces of mapping information according to string matching results.

The string matching system, according to an exemplary embodiment of the present invention, may also include an input string extraction unit (not shown) which receives multimedia data including a string and extracts the string from the multimedia data as an input string. In addition, the representative string determination unit 103 may change the string in the multimedia data into an output representative string.

Figure 3:
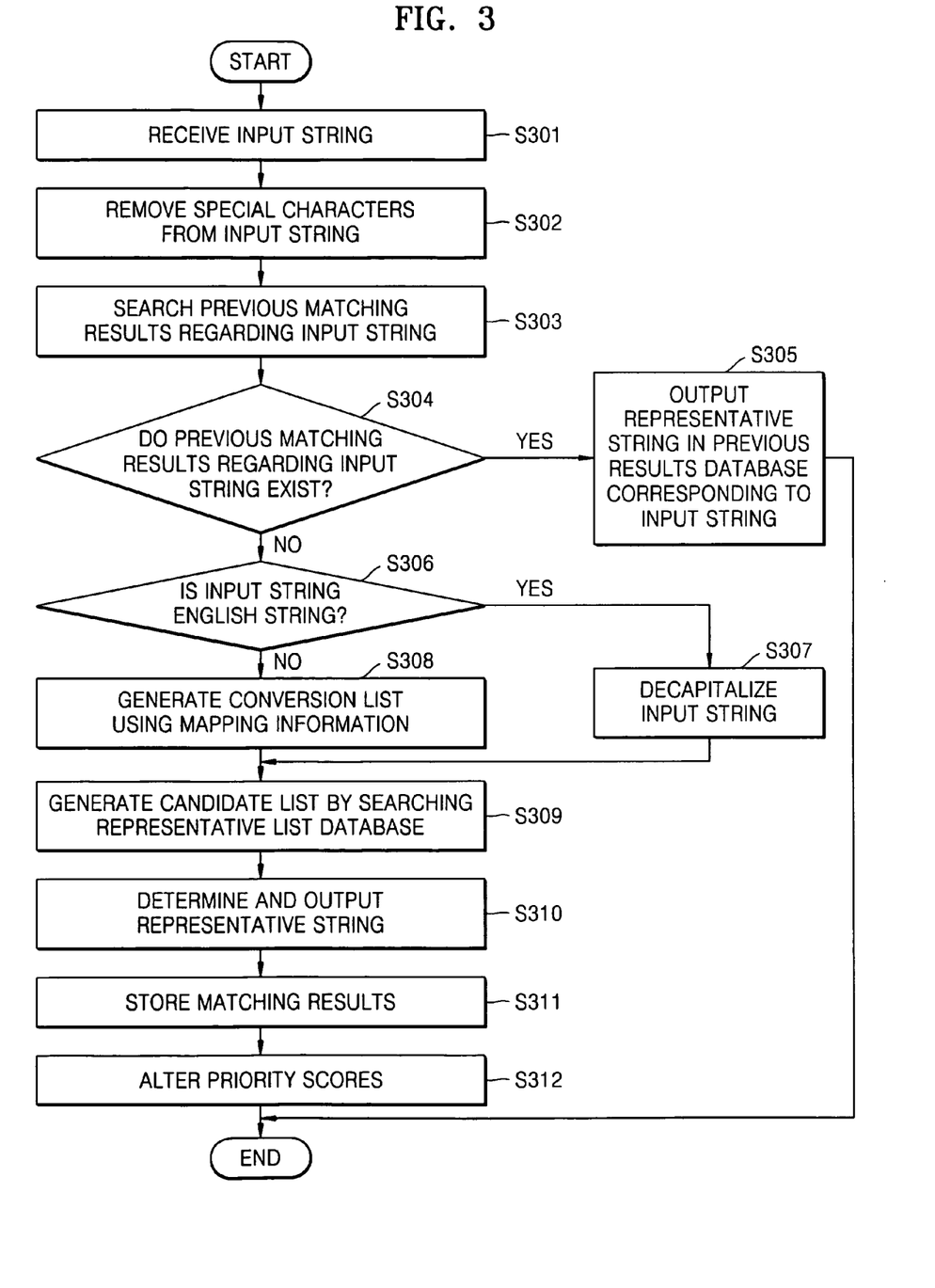
FIG. 3 is a flowchart illustrating a string matching method according to an exemplary embodiment of the present invention.

FIG. 3 is a flowchart illustrating a string matching method according to an exemplary embodiment of the present invention. By way of an example, it will be assumed that a first language and a second language are Korean and English, respectively. Obviously, the first and second language may be languages other than Korean and English.

Figure 10:
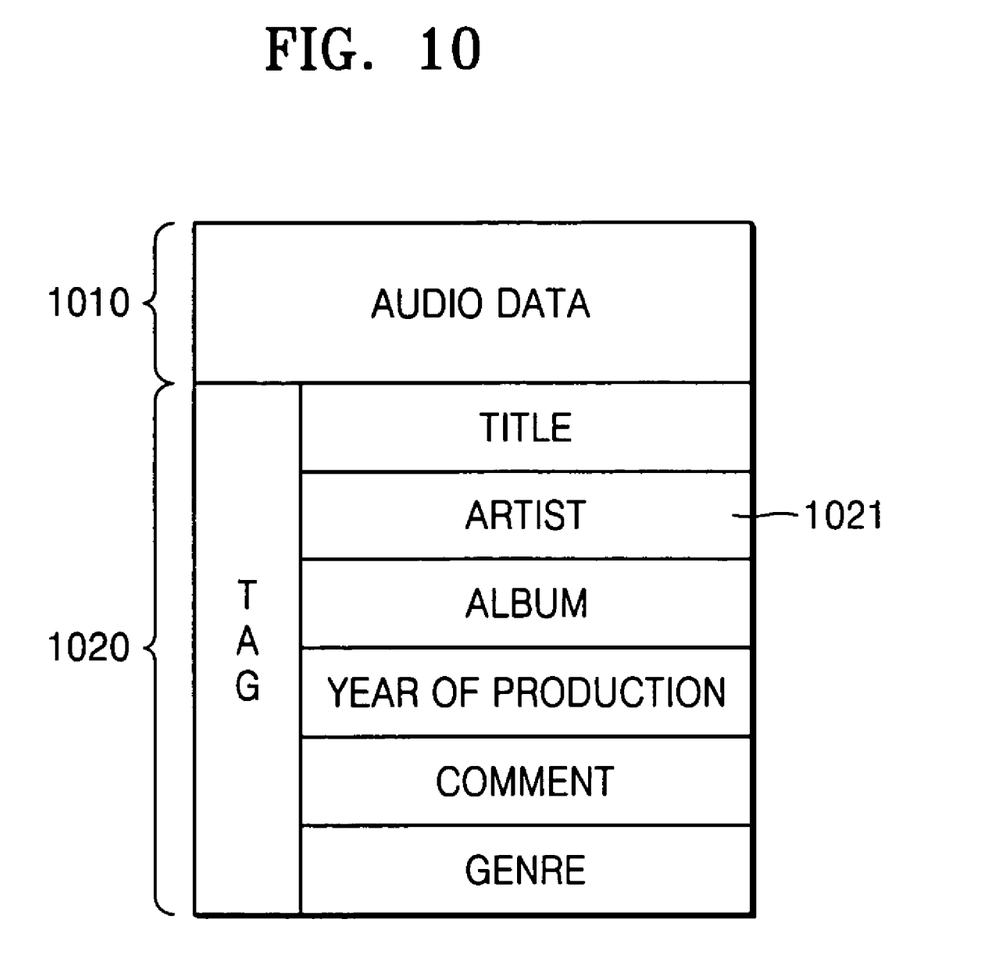
FIG. 10 is a diagram illustrating an exemplary format of an MP3 file.

Referring to FIG. 3, in operation S301, an input string is obtained by, for example, parsing an MP3 file and extracting the name of an artist included in an ID3 tag. FIG. 10 is a diagram illustrating an exemplary format of an MP3 file. Referring to FIG. 10, the MP3 file includes audio data 1010 and a tag 1020. Artist name information 1021 is extracted from the tag 1020 by parsing the MP3 file.

In operation S302, special characters (e.g., hyphens '-' and spaces ' '), if any, are removed from the input string. In operation S303, the previous results database 140 is searched to find a match for the input string. If a representative string that matches the input string is found in the previous results database 140 in operation S304, the found representative string is determined to be an output representative string in operation S305. Thereafter, the string matching method is terminated.

On the other hand, if the match in the previous results database 140 is not found in operation S304, a determination is made as to whether the string is an English string in operation S306. If the input string is determined to be a Korean string in operation S306, a conversion list is generated with reference to a plurality of pieces of mapping information included in a language mapping tables in operation S308. The language mapping tables may include: a plurality of pieces of mapping information used to map an consonant-vowel cluster of a syllable of the Korean string to one or more English strings separately from a last consonant of the syllable of the Korean string; and a plurality of mapping information used to map a consonant, if any, of a syllable of a Korean string to one or more English strings, and the conversion list may be generated using the plurality of pieces of information stored in the language mapping tables.

In operation S306, if the input string is determined to be an English string, the input string is decapitalized without the need to reference the language mapping table, and a conversion list including the decapitalization input string is generated.

In operation S309, the representative list database 130 is searched to find matches for the English strings included in the conversion list, and a candidate list is generated based on the search results. The candidate list is a list of records, each comprising a representative English string and a corresponding representative string, and the representative English strings in the records match the respective English strings included in the conversion list.

In operation S310, one of the records in the candidate list is chosen, and a representative string included in the chosen record is determined to be an output representative string. The output representative string replaces the input string so that it can be displayed in a multimedia data location where the input string was previously located. For example, the output representative string, instead of the input string, may be stored in the location of the artist name information 1021 depicted in FIG. 10.

In operation S311, the output representative string determined in operation S310 is stored in the previous results database 140 together with the input string. However, if the input string is determined to be the output representative string i.e., if the input string does not exist in the representative list database 130, the input string is stored in the representative list database 130 as a representative string. In this case, the input string may be stored in the representative list database 130 together with the English string in the conversion list that has a highest matching score.

In operation S312, if a user chooses one of the records in the candidate list so that a representative string included in the chosen record is determined to be the output representative string, priority scores respectively given to a plurality of pieces of mapping information used to convert the input string into the output representative string may be altered so that the alteration results can be referenced in subsequent string matching operations.

Figure 4:
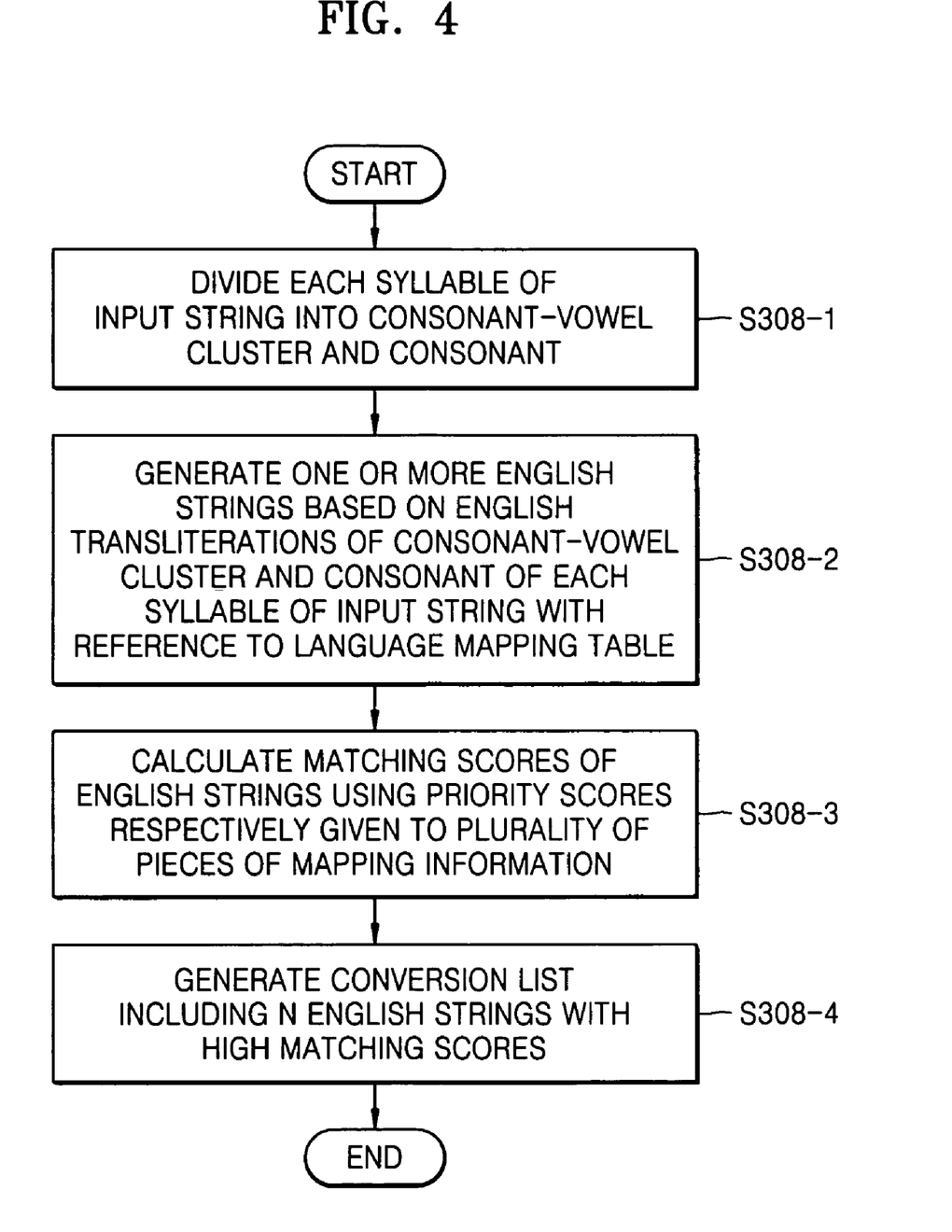
FIG. 4 is a flowchart illustrating the generation of a plurality of second-language strings according to an exemplary embodiment of the present invention.

FIG. 4 is a flowchart illustrating the generation, such as the operation S308 of FIG. 3, of second-language strings according to an exemplary embodiment of the present invention. Referring to FIG. 4, in operation S308-1, each syllable of the input string is divided into a consonant-vowel cluster and a consonant. In operation S308-2, each of the consonant-vowel cluster and the consonant of each syllable of the input string is mapped to one or more English strings, thereby obtaining one or more English transliterations of the input string.

FIGS. 7A and 7B are diagrams of a Korean consonant-vowel cluster mapping table and a Korean consonant mapping table included in language mapping tables according to an exemplary embodiment of the present invention. Referring to FIGS. 7A and 7B, the Korean consonant-vowel cluster mapping table provides up to three English transliterations of each of a plurality of Korean consonant-vowel clusters S1 through Sn, and the Korean consonant mapping table provides up to three English transliterations of each of a plurality of Korean consonants T1 through Tk. The number of English transliterations provided for each of the Korean consonant-vowel clusters S1 through Sn or for each of the Korean consonants T1 through Tk may be altered.

Referring to FIG. 7A, the Korean consonant-vowel cluster mapping table includes the Korean consonant-vowel clusters S1 through Sn and respective corresponding sets of one or more English transliterations. Referring to FIG. 7B, the Korean consonant mapping table includes the Korean consonants T1 through Tk, which may serve as final phonemes Korean syllables, and respective corresponding sets of one or more English transliterations. Referring to FIG. 7A, the Korean consonant-vowel cluster S3 and two English transliterations of the Korean consonant-vowel cluster S3, i.e., 'gou' and 'geo', are recorded in a row 711, and the Korean consonant-vowel cluster Sn has three English transliterations 'hee', 'hui', and 'heui,' recorded in a row 712.

Referring to FIG. 7B, the Korean consonant T2 is mapped to an English letter 'n' as indicated in a row 721. Therefore, if the input string is a Korean string consisting of the Korean consonant-vowel cluster S3, the Korean consonant T2, and the Korean consonant-vowel cluster Sn, a plurality of English transliterations of the input string are possible, which are 'gounhee', 'gounhui', 'gounheui', 'geonhee', 'geonhui', and 'geonheui'.

Referring to FIGS. 7A and 7B, a syllable of a Korean string may have up to 9 English transliterations. Therefore, for convenience of string matching, a conversion list may need to be generated to include only a predetermined number (n) of English transliterations of the input string. To generate a list with only a predetermined numbers, priority scores may be given to the English transliterations of each of the Korean consonant-vowel clusters S1 through Sn and to the English transliterations of each of the Korean consonants T1 through T4. Referring to FIG. 4, in operation S308-3, matching scores of the English transliterations of the input string obtained in operation S308-2 are calculated with reference to the priority scores. In operation S308-4, a conversion list including only n of the English transliterations of the input string with relatively high matching scores is generated. Different priority scores may be given to each column of each of the Korean consonant-vowel cluster mapping table and the Korean consonant mapping table. Alternatively, different priority scores may be given to each mapping information entry of each of the Korean consonant-vowel cluster mapping table and the Korean consonant mapping table. For example, assuming that priority scores of 10, 7, and 4 points are given to first, second, and third columns 701, 702, and 703, respectively, of each of the Korean consonant-vowel cluster mapping table and the Korean consonant mapping table, the matching scores of the English transliterations 'gounhee', 'gounhui', 'gounheui', 'geonhee', 'geonhui', and 'geonheui' may be calculated in operation S308-3 as follows:

Matching Score of 'gounhee'=30 points (10 points for 'gou'+10 points for 'n'+10 points for 'hee');

Matching Score of 'gounhui'=27 points (10 points for 'gou'+10 points for 'n'+7 points for 'hui');

Matching Score of 'gounheui'=24 points (10 points for 'gou'+10 points for 'n'+4 points for 'heui');

Matching Score of 'geonhee'=27 points (7 points for 'geo'+10 points for 'n'+10 points for 'hee');

Matching Score of 'geonhui'=24 points (7 points for 'geo'+10 points for 'n'+7 points for 'hui'); and Matching Score of 'geonheui'=21 points (7 points for 'geo'+10 points for 'n'+4 points for 'heui').

If the maximum number n of English strings in the conversion list is 3, a conversion list may be generated to include only three English transliterations of the input string with the highest matching scores, i.e., 'gounhee', 'gounhui', and 'geonhee', in operation S308-4. Alternatively, the conversion list may be generated to include a number of English transliterations of the input string whose matching scores exceed a predetermined value. Setting the predetermined number of the English strings for the conversion list is provided by way of an example and not by way of a limitations, various other conditions may be set and are within the scope of the invention e.g., the predetermined threshold not to exceed n but all strings with the priority above x are to be included in the conversion list.

Figure 5:
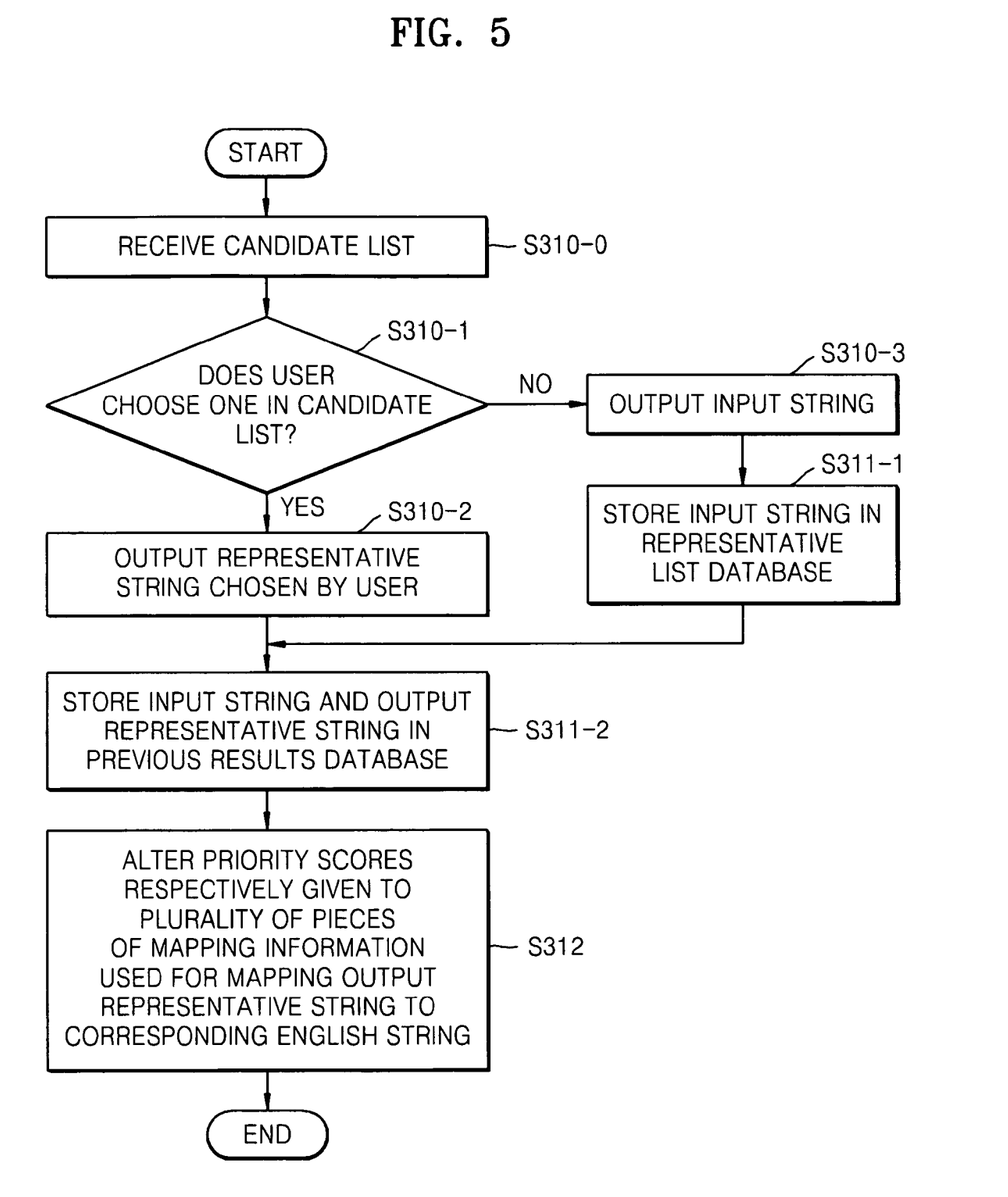
FIG. 5 is a flowchart illustrating the determining of a representative string by a user according to an exemplary embodiment of the present invention.

FIG. 5 is a flowchart illustrating exemplary process of determining a representative string by a user according to an exemplary embodiment of the present invention. Referring to FIG. 5, in operation S310-0, the candidate list generated in operation S309 of FIG. 3 is received. For example, referring to FIG. 9, if the input string is a Korean string consisting of two syllables 'ru' and 'ra', the candidate list generated in operation S309 by searching the representative list database 130 may include a record 911 comprising a representative string representative_string2 and an English representative string english representative_string2 (e.g., 'roola'), and a record 912 comprising a representative string representative_string3 and an English representative string english_representative_string3 (e.g., 'roora').

If the user chooses one of the records included in the candidate list in operation S310-1, a representative string included in the chosen record may be determined to be an output representative string in operation S310-2. If the user chooses the record 911 in operation S310-1, the input string and the representative string included in the record 911 may be stored in the previous results database 140 in operation S311-2 so that they can be referenced later when the same string as the input string is input.

If the user declines to choose any of the records included in the candidate list and wants to use the input string as is for an output representative string in operation S310-1, the input string may be determined to be the output representative string in operation S310-3 and then is stored in the representative list database 130 in operation S311-1. In operation S311-2, the input string and the output representative string are stored in the previous results database 140 so that they can be referenced first in subsequent string matching operations.

If the output representative string is determined by the user, the priority scores respectively given to a plurality of pieces of mapping information used for mapping the output representative string to a corresponding English string are altered in operation S312 by, for example, applying weights to the plurality of pieces of mapping information so that the priorities therein can be updated to appropriately reflect the user's preferences.

Figure 6:
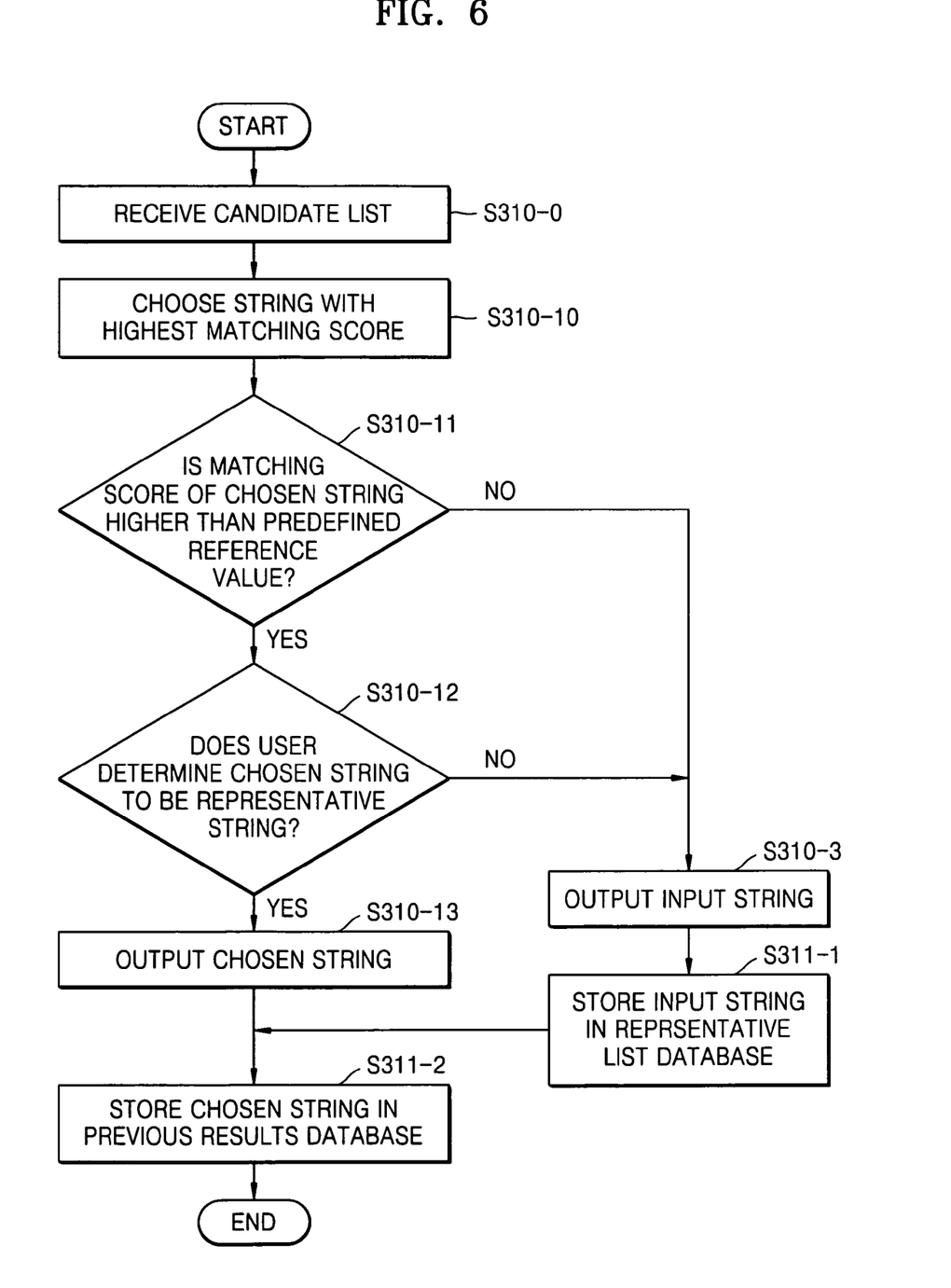
FIG. 6 is a flowchart illustrating the determining of a representative string based on a matching score according to an exemplary embodiment of the present invention.

FIG. 6 is a flowchart illustrating the exemplary process of determining one of a plurality of strings to be a representative string based on matching scores of the strings according to an exemplary embodiment of the present invention.

Referring to FIG. 6, in operation S310-0, the candidate list generated in operation S309 is received. If a service currently being provided to the user does not require a user selection process, a representative string corresponding to one of a plurality of English representative strings included in the candidate list having the highest matching score is determined to be an output representative string. Optionally, if none of the representative English strings included in the candidate list are determined to exceed a predefined reference value in operation S310-11, the input string may be determined to be a representative string in operation S310-3 and then is stored in the representative list database 130 in operation S311-1, thereby enhancing the reliability of string matching results.

On the other hand if the score is higher than a predefined reference value, in operation S310-111, the process proceeds to operation S310-12. In operation S310-12, if the user determines the representative string corresponding to the English string with the highest matching score to be the representative string, the representative string may be determined to be an output representative string in operation S310-13. In operation S311-2, the string matching results obtained in operation S310-13 or S310-3 are stored in the previous results database 140.

The present invention may be implemented as computer-readable code written on a computer-readable medium.

As described above, in various exemplary embodiments of the present invention, it is possible to search for a representative string for a plurality of strings written in different languages and/or in different manners. Therefore, the exemplary embodiments of the present invention may be suitable for services providing multimedia data classifications according to a string input by a user. For example, in a case where an MP3 player provides artist name-based music file classification scenarios, the MP3 player can match a plurality of strings which refer to the same artist but are input in different languages and/or in different manners by a user with a single representative string and can precisely provide the user with a plurality of music files corresponding to the representative string.

In addition, in an exemplary embodiment of the present invention, a Korean string is mapped to one or more English strings in such a manner that a consonant-vowel cluster and a last consonant of each syllable of the Korean string are separately mapped to respective corresponding sets of English transliterations. Therefore, it is possible to carry out a string matching algorithm in a simple but highly efficient manner. Moreover, it is possible to optimize string matching results by adaptively altering priority scores respectively given to a plurality of pieces of mapping information used to produce the string matching results.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A string matching method to output a representative string that matches an input string, the string matching method comprising:
   converting the input string into a plurality of second-language strings with reference to a language mapping storage, which stores a plurality of pieces of mapping information that maps mapping a consonant-vowel cluster of a Korean syllable in the input string to one or more strings in the second language and a plurality of pieces of mapping information that maps a last consonant of a Korean syllable in the input string to one or more strings in the second language, and generating a conversion list comprising the second-language strings, obtained from the converting of the input string, where each of the second-language strings is a possible transliteration of the input string;
   searching a representative list storage, which stores a plurality of records, each of the records comprising a representative string and a corresponding second-language representative string, wherein the representative list storage is searched for records comprising the same second-language representative strings as the respective second-language strings included of the conversion list, and generating a candidate list comprising results from the searching; and
   determining an output representative string by selecting a representative string from one of the records of the candidate list.

2. The string matching method of claim 1 further comprising:
   searching a previous results storage, which stores previously selected results for a string that matches the input string and determining an output representative string corresponding to the string that matches the input string if the same string as the input string exists in the previous results storage, wherein the previous string matching results comprise a plurality of strings and respective corresponding representative strings; and
   if the input string does not exist in the previous results storage, storing the input string and the output representative string in the previous results storage.

3. The string matching method of claim 2, wherein the converting the input string into one or more second-language strings comprises removing special characters that are meaningless from the input string.

4. The string matching method of claim 3, wherein the special characters comprise hyphens and spaces.

5. The string matching method of claim 3, further comprising giving priority scores to the plurality of pieces of mapping information included in the language mapping storage,
   wherein the converting the input string into the one or more second-language strings and the generating the conversion list comprise calculating matching scores of the second-language strings into which the input string is converted and generating a conversion list including only a predefined number of second-language strings into which the input string is converted and which have high matching scores.

6. The string matching method of claim 3, wherein the determining of the output representative string comprises allowing a user to choose one of the records in the candidate list so that a representative string in the chosen record is determined to be the output representative string.

7. The string matching method of claim 3, further comprising respectively giving priority scores to the plurality of pieces of mapping information in the language mapping storage,
   wherein the converting the input string into the one or more second-language strings and the generation of the conversion list comprise calculating matching scores of the second-language strings into which the input string is converted, and
   wherein the determining of the representative string comprises determining a representative string corresponding to an English string in the candidate list with a highest matching score to be the output representative string.

8. The string matching method of claim 1 further comprising receiving multimedia data comprising the input string, and extracting the input string from the multimedia data.

9. The string matching method of claim 8, wherein the multimedia data is an MPEG Audio Layer-3 (MP3) file, and the extraction of the input string comprises extracting an artist's name in an identification tag of the MP3 file by parsing the MP3 file.

10. The string matching method of claim 9, wherein the determining of the output representative string comprises replacing the input string in the multimedia data with the output representative string.

11. A non-transitory computer-readable medium storing a computer program for executing a string matching method to output a representative string that matches an input string, the string matching method comprising:

converting the input string into a plurality of second-language strings with reference to a language mapping storage, which stores a plurality of pieces of mapping information that maps a consonant-vowel cluster of a Korean syllable in the input string to one or more strings in the second language and a plurality of pieces of mapping information that maps, a last consonant of a Korean syllable in the input string to one or more strings in the second language-and generating a conversion list comprising the second-language strings into which the input string is converted, where each of the second-language strings is a possible transliteration of the input string;

searching a representative list storage, which stores a plurality of records, each of the records comprising a representative string and a corresponding second-language representative string, for the records comprising the same second-language representative strings as the respective second-language strings in the conversion list and generating a candidate list comprising the search results; and determining a representative string in one of the records of the candidate list to be an output representative string.

12. A string matching system that outputs a representative string that matches an input string, the string matching system comprising:

a representative list storage, which stores a plurality of representative strings and respective, corresponding, representative second-language strings;

a language mapping storage, which stores a plurality of pieces of mapping information that maps a consonant-vowel cluster of a Korean syllable in the input string to one or more strings in the second language and a plurality of pieces of mapping information that maps a last consonant of a Korean syllable in the input string to one or more strings in the second language;

a second-language string generation unit which converts the input string into a plurality of second-language strings with reference to the language mapping storage and generates a conversion list comprising the second-language strings into which the input string is converted, where each of the second-language strings is a possible transliteration of the input string;

a representative list searching unit, which searches the representative list storage for records comprising the same representative second-language strings as the respective second-language strings in the conversion list, and which generates a candidate list comprising the search results; and a representative string determination unit executed by a computer, which determines a representative string in one of the records of the candidate list to be an output representative string.

13. The string matching system of claim 12 further comprising:

a previous results storage, which stores previous string matching results, comprising a plurality of strings and respective corresponding representative strings;

a previous results searching unit, which searches the previous results storage for a string that matches the input string and if the string is found in the previous results storage, determines a representative string corresponding to the found string to be the output representative string for the input string; and a results storage unit, which stores the input string and the output representative string in the previous results storage if the input string and the output representative string do not exist in the previous results storage.

14. The string matching system of claim 13, wherein the second-language string generation unit removes special characters that are meaningless from the input string and converts the resulting input string into one or more English strings.

15. The string matching system of claim 14, wherein priority scores are respectively given to the plurality of pieces of mapping information in the language mapping storage, and the second-language string generation unit calculates matching scores of the second-language strings into which the input string is converted and generates a conversion list comprising only a predefined number of second-language strings into which the input string is converted and which have high matching scores.

16. The string matching system of claim 15, wherein the representative string determination unit determines a representative string corresponding to an English string in the candidate list with a highest matching score to be the output representative string.

17. The string matching system of claim 16, wherein, if none of the matching scores of the second-language strings in the candidate list exceed the predefined reference value, the representative string determination unit determines the input string to be the output representative string, wherein, if the representative string determination unit determines the input string to be the output representative string, the results storage unit stores the input string and the English string in the candidate list with the highest matching score in the representative list storage.

18. The string matching system of claim 16 further comprising an input string extraction unit, which receives multimedia data comprising the input string and extracts the input string from the multimedia data.

19. The string matching system of claim 18, wherein the representative string determination unit replaces the input string in the multimedia data with the output representative string.

20. The string matching method of claim 1, further comprising searching the representative list storage by comparing the input string with the representative string in the first-language, and wherein if the representative string is found, determining that the output representative string is the corresponding second-language representative string.

* * * * *